United States Patent
Stanich (12)

(10) Patent No.: US 6,411,322 B1
(45) Date of Patent: Jun. 25, 2002

(54) TEST PATTERN FOR USE TO ADJUST MULTIPLE BEAM SPOT SPACING

(75) Inventor: Mikel J. Stanich, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/354,296

(22) Filed: Jul. 15, 1999

(51) Int. Cl.[7] .............................. B41J 2/47; B41J 2/455
(52) U.S. Cl. ..................... 347/240; 347/233; 347/251
(58) Field of Search ............................... 347/233, 237, 347/240, 19, 234, 248, 251, 116, 129, 131, 132, 224, 225, 241; 358/1.8

(56) References Cited

U.S. PATENT DOCUMENTS

| | | | | |
|---|---|---|---|---|
| 4,796,964 A | * | 1/1989 | Connell et al. | 359/204 |
| 4,878,063 A | * | 10/1989 | Katerberg | 347/19 |
| 4,978,849 A | | 12/1990 | Goddard et al. | 250/235 |
| 5,255,010 A | * | 10/1993 | Mackin | 347/237 |
| 5,323,179 A | * | 6/1994 | Sanger et al. | 347/237 |
| 5,508,826 A | | 4/1996 | Lloyd et al. | 358/501 |
| 5,600,350 A | | 2/1997 | Cobbs et al. | 347/19 |
| 5,748,223 A | * | 5/1998 | Ito | 347/241 |
| 5,825,378 A | | 10/1998 | Beauchamp | 347/19 |
| 5,835,108 A | | 11/1998 | Beauchamp et al. | 347/19 |
| 6,137,592 A | * | 10/2000 | Arquilevich et al. | 358/1.8 |

OTHER PUBLICATIONS

Carlson, Curtis R., "Economic Display Design," Information Display, May 1988.

* cited by examiner

*Primary Examiner*—Hai Pham
(74) *Attorney, Agent, or Firm*—Blakely, Sokoloff, Taylor & Zafman (57) ABSTRACT

A method that involves sweeping multiple beams for a plurality of sweeps. The multiple beams are modulated for the plurality of sweeps according to a test pattern. The test pattern has an associated vernier period and the vernier period corresponds to a wavelength. The wavelength is perceptible to the human eye. An apparatus having a printhead configured to produce multiple beams where the multiple beams are configured to be modulated according to a stored test pattern. The test pattern has an associated vernier period and the vernier period corresponds to a wavelength. The wavelength is perceptible to the human eye.

26 Claims, 6 Drawing Sheets

SWEEP DIRECTION
(PRIOR ART)

FIG. 6

TEST PATTERN FOR USE TO ADJUST MULTIPLE BEAM SPOT SPACING

FIELD OF INVENTION

The field of invention relates generally to the field of printing. More specifically, the invention relates to test patterns used for adjusting spot spacings in multiple beam printheads.

BACKGROUND OF THE INVENTION

Laser printing involves directing a beam of laser light to a photoconducting drum (also referred to simply as a drum). In a typical process, the laser illuminated drum regions electrostatically attract toner particles which are subsequently transferred to a piece of paper. Thus the laser illuminated drum regions typically correspond to the printed matter on the paper.

Multiple beam printhead technology involves simultaneously directing multiple laser beams onto the drum. Currently technology employs four or five laser beams per printhead. FIG. 1 shows a depiction of the operation a four beam printhead technology. FIG. 1 is not drawn to scale.

Figure 1A:
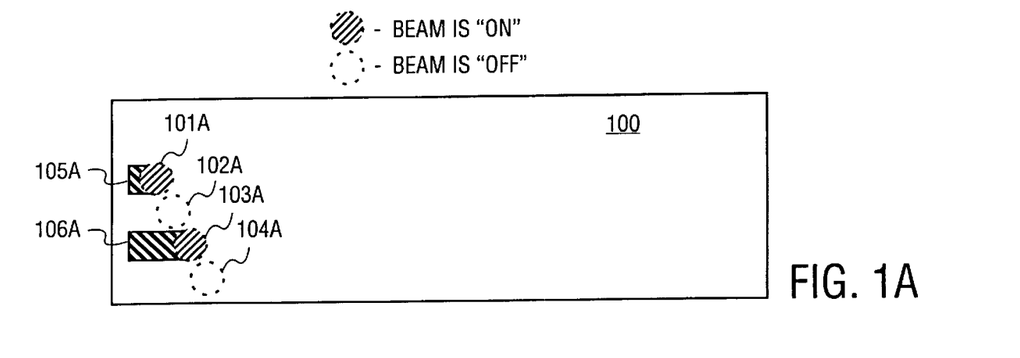
FIGS. 1A–1D shows a depiction of the operation of a four beam printhead technology.

Referring to FIG. 1a, each laser beam has an associated spot location 101a–104a (also referred to as spots 101a–104a). The size and placement of spots 101a–104a are determined by the optical system of the printhead. The printhead also has the ability to sweep the spots 101a–104a from left to right across the drum surface 100. As FIG. 1a shows, the laser beams associated with spots 101a and 103a are "on" while the laser beams associatedwith spots 102a and 104a are "off". The spots spacing between spots 101a–104a is constant.

As the spots 101a–104a are swept across the drum surface 100, the regions 105a, 106a of the drum exposed to the "on" laser beam are electrostatically altered such that toner materials are attracted to them. FIG. 1 therefore also shows the relationship between the spots 101a–104a and the printed end product.

Figure 1B:
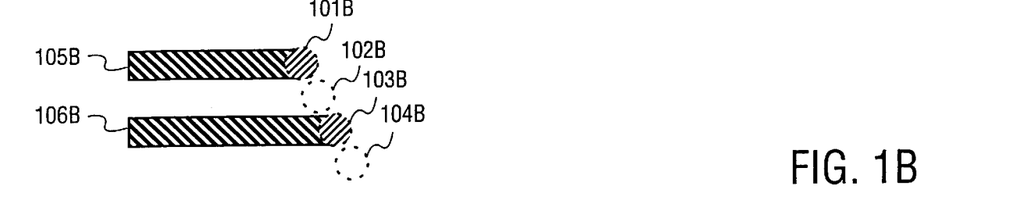

FIG. 1b shows the printed matter regions 105b, 106b if the printhead continues to sweep the spot locations 101b–104b from left to right with the same coordination of "on" and "off" laser beams as in FIG. 1a. That is, beams associated 101a, 103a of FIG. 1a and 101b, 103b of FIG. 1b remain "on" while beams associated with 102a, 104a of FIG. 1a and 102b, 104b of FIG. 1b remain "off".

Figure 1C:
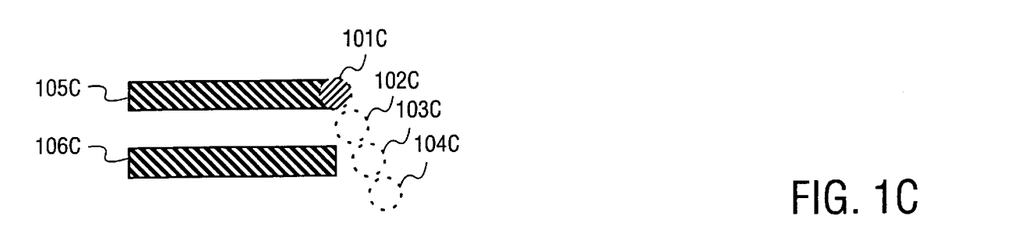
Figure 1D:
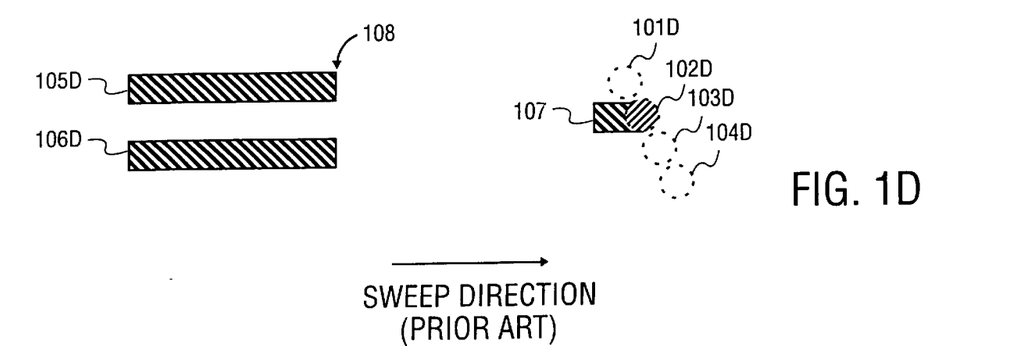

FIG. 1c shows the printed matter regions 105c, 106c if the laser beam associated with spot location 103c is eventually turned "off" at some point after the situation shown with respect to FIG. 1b and the printhead continues to sweep the spots 101c–104c. FIG. 1d shows the printed matter regions 105d, 106d if the laser beam associated with spot 101d is turned off such that edges 108 of the printed matter regions 105d, 106d "line up". FIG. 1d also shows the beam associated with spot 102d has turned "on" at some later time. Thus regions 105d, 106d may also be viewed as the printed matter on the page once the printing process is complete.

Ultimately the sweep reaches near the right edge of the drum (which corresponds to the right edge of the finished page). The drum rotates up 4.0 PELS (which corresponds to lowering the spots to a new row just beneath the completed row) and the spots are swept again. Depending on the printing apparatus used, the spots may be swept from right to left during the sweeping of the second row; or, similar to a typewriter, the laser beam writing process may always start from the left. Other printers may always start from the right.

Figure 2:
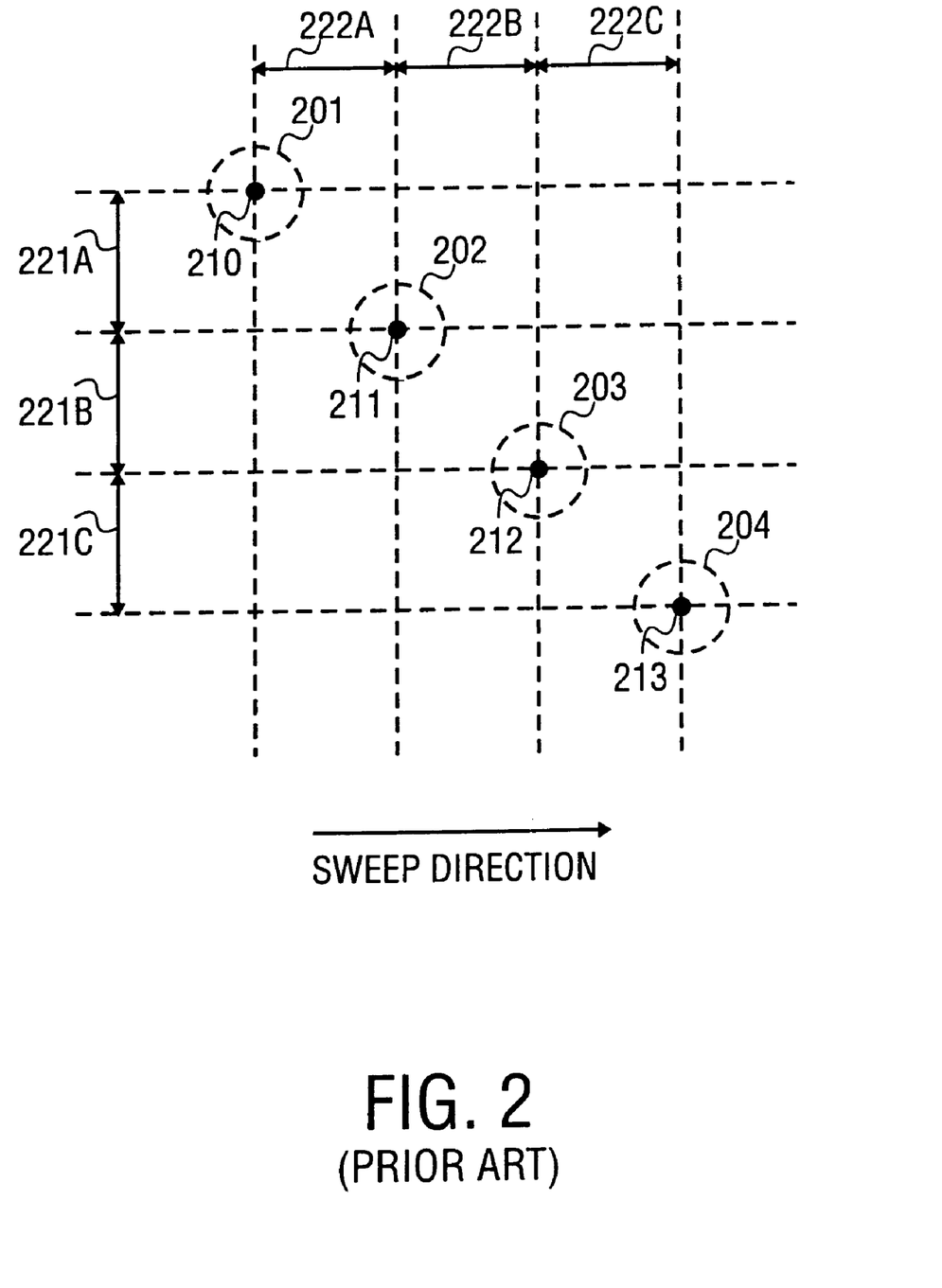
FIG. 2 shows a more detailed view of the printhead's coupling of the spot locations shown with respect to FIG. 1A.

FIG. 2 shows a more detailed view of the printhead's spacing of the spots 201–204. FIG. 2 shows a slanted angle printhead (also shown in FIG. 1). 1.0 picture element (PEL) is the "designed for"distance 221a, b, c between spot center locations 210–213 (also referred to as spot location origins 210–213). The actual spacing between adjacent spot center locations 210–213 changes from printer type to printer type. In typical applications, the vertical distance 221a, b, c between the spot location origins 210–213 is designed to be 1.0 PEL while the horizontal distance 222a, b, c is designed to be 40.0 PELs. Printer addressability is typically measured in Dots Per Inch (DPI). A PEL is therefore 1/DPI in the vertical direction. Horizontal distance is the distance along the sweep direction, while vertical distance is the distance perpendicular to the sweep direction.

The quality of images produced by multiple beam printheads is sensitive to the vertical spacings 221a, b, c (also referred to as spacings). For example, if the spacings 221a, b, c are different than the spacings the image was supposed to be formed with (i.e., something other than 1/DPI of the designed for image), undesirable "bands" (also referred to as banding) may appear in the image. Thus vertical spacings 221a, b, c are important to the quality of the printed image. The spacings 221a,b,c may be accurately set in a manufacturing environment with sophisticated equipment such as cameras or other alignment tools. However, those involved in field service repairs typically do not have access to such equipment. As such, a test pattern that assists field service personnel in accurate alignment without the use of alignment equipment would improve the optical alignment of field installed or field adjusted printheads.

SUMMARY OF THE INVENTION

A method is described comprising sweeping multiple beams for a plurality of sweeps. The multiple beams are modulated for the plurality of sweeps according to a test pattern. The test pattern has an associated vernier period and the vernier period corresponds to a wavelength. The wavelength is perceptible to the human eye.

An apparatus is described comprising a printhead configured to produce multiple beams where the multiple beams are configured to be modulated according to a stored test pattern. The test pattern has an associated vernier period and the vernier period corresponds to a wavelength. The wavelength is perceptible to the human eye.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method is described comprising sweeping multiple beams for a plurality of sweeps. The multiple beams are modulated for the plurality of sweeps according to a test pattern. The test pattern has an associated vernier period and the vernier period corresponds to a wavelength. The wavelength is perceptible to the human eye.

An apparatus is described comprising a printhead configured to produce multiple beams where the multiple beams are configured to be modulated according to a stored test pattern. The test pattern has an associated vernier period and the vernier period corresponds to a wavelength. The wavelength is perceptible to the human eye.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

In order to better assist field personnel, a printed test pattern should make errors in spot spacing "stand out". Furthermore, field personnel should be able to identify the type of corrective action needed to correct the spacing error simply by observing the test pattern printout. That is, the test pattern images should change depending on the type of spot spacing error that exists. Then field personnel may adjust the spacing according to the test pattern printout.

Figure 3:
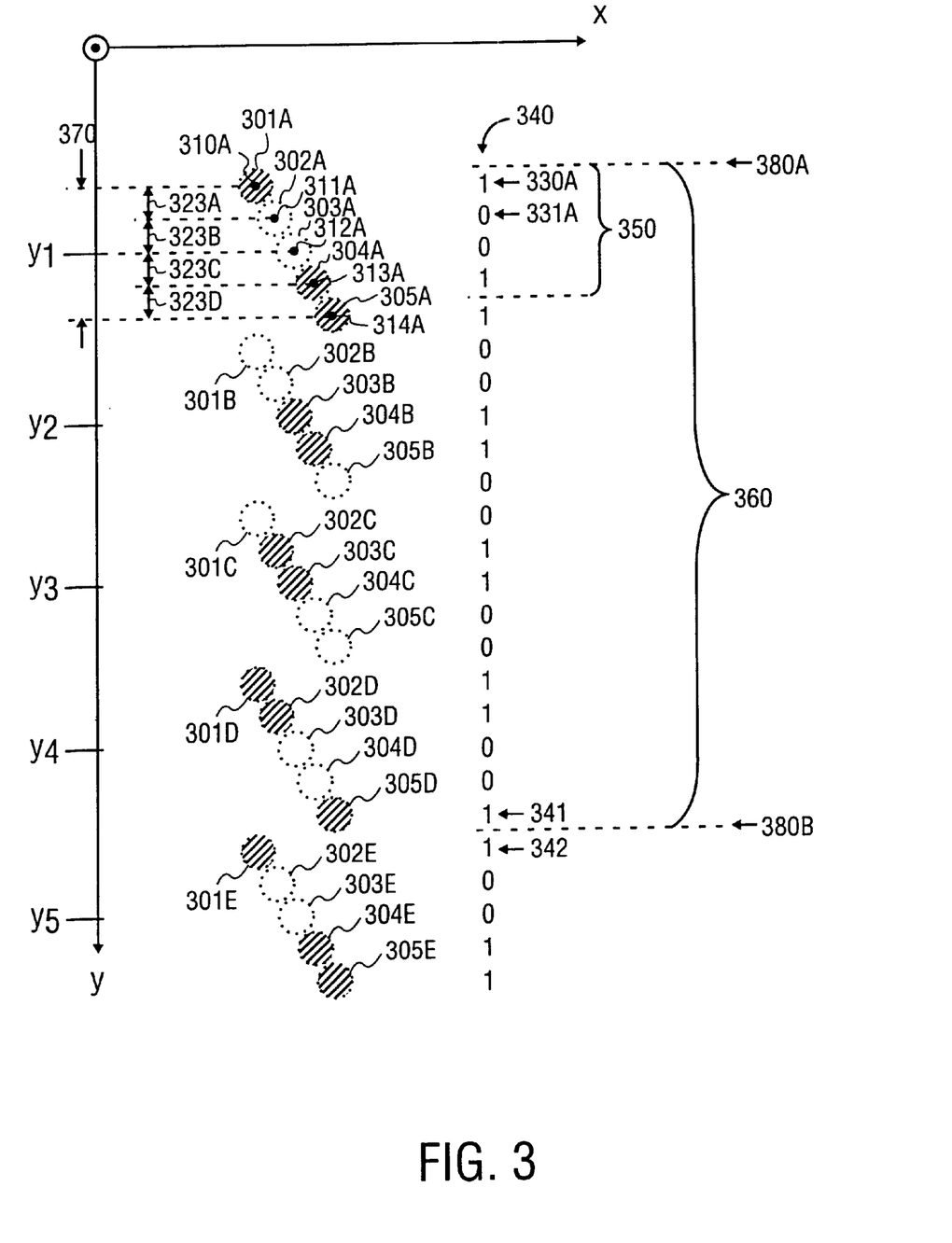
FIG. 3 shows an embodiment of a test pattern.

An embodiment of such a test pattern is shown in FIG. 3. The embodiment of FIG. 3 relates to a five beam printhead. FIG. 3 also depicts multiple sweeps across the drum:1) spot locations 301a–305a correspond to a first sweep across the drum;2) spot locations 301b–305b, correspond to the a second sweep across the drum;3) spot locations 301c–305c correspond to a third sweep across the drum;4) spot locations 301d–305d correspond to a fourth sweep across the drum; and 5) spot locations 301e–305e correspond to a fifth sweep across the drum.

In this embodiment, sweeps are from left to right, along the x axis. When a sweep is completed the drum rotates 5.0 PELS effectively droping down to the next sweep row. Sweep rows are positions on a drum along which printhead sweeps are executed. Thus, the first sweep is centered upon sweep row y1, the second sweep is centered upon sweep row y2, the third sweep is centered upon sweep row y3, the fourth sweep is centered upon sweep row y4 and the fifth sweep is centered upon sweep row y5.

The "designed for" vertical spacing 323a–d between each of the spot location origins 310a–314a (also referred to as vertical spacings) is 1.0 PEL. 1.0 PEL is equal to 1/DPI. As discussed in the background, the image quality is sensitive to vertical spacings 323a–d other than 1.0 PEL. That is, quality suffers if the actual vertical spacings 323a–d are different than the designed for vertical spacings.

For example, if a "600" DPI printer prints images with vertical spot spacings at something other than 600 DPI (e.g., 607 DPI) image quality begins to suffer. Correcting or otherwise adjusting the vertical spacings 323a–d is typically accomplished by adjusting a prism within the printer. Note that because one printhead is typically used, the vertical spacings 323a–d are usually the same from sweep to sweep. That is, if the vertical spacings 323a–d are slightly less the 1.0 PEL for one sweep they are less than 1.0 PEL by the same amount for all sweeps.

Other than multiple sweeps, FIG. 3 shows an embodiment of a test pattern 340 where the binary values associated with each spot location are provided for each sweep. That is, the binary value 330a associated with spot location 301a is a "1" while the binary value 331a associated with spot location 302a is a "0", etc. The test pattern is the sequence 340 of binary values. Test patterns may also be referred to as test sequences.

In this embodiment, a binary value of "1" means the beam associated with the spot location is "on" for the duration of the sweep across the drum. A binary value of "0" means the beam associated with the spot location is "off" for the duration of the sweep across the drum. As an example, referring briefly back to FIG. 1, the binary values associated with the moment in time depicted in FIG. 1b is "1010". Thus, referring back to FIG. 3, the test pattern 340 produces a series of solid lines in the direction of the sweep (i.e., horizontal, along the x axis) and the solid lines are formed where the corresponding binary value is "1". The turning "on" and "off" of a beam according to a binary value may be referred to as modulating the beam.

The test sequence 340 has a period 350 of four binary values. A test pattern sequence 340 is the combination of 1s and g0s that repeat according to the test pattern period 350. Other test pattern embodiments may have imbalanced combinations of 1s and 0s which result in a darker appearance (in the case of more 1s) or lighter (in the case of more 0s) than the perfectly balanced combination within period 350 of FIG. 3.

A halftone image is any combination of binary values that, when executed by the printhead and printed on a page appear to the viewer as a continuous color. In the case of black and white printers the combination of binary values will produce a continuous shade of gray.

As is known in the art, 600 DPI, 106 Lines Per Inch (LPI) halftone images have a period of 4 binary values. 141 LPI (with 600 DPI) halftone images have a period of 3 binary values; 85 LPI (with 600 DPI) halftone images have a period of 5 binary values and 71 LPI (with 600 DPI) halftone images have a period of 6 PELs. Other halftone periods may be readily determined by those skilled in the art for printers having LPI values other than 71, 85, 106 and 141 at 600 DPI. As is known in the art, an LPI is typically measured by the number of pixels encountered per inch along a ray directed at a 45° across the printed image.

Note also the Vernier effect that results from having a test pattern period magnitude that is different than the number of beams within the printhead. That is, the test pattern 340 of FIG. 3 has a period 350 of four binary values. The printhead has five beams corresponding to spot locations 301a–305a. In the embodiment of FIG. 3, the combination of four binary values and five beams produces a vernier effect having a period 360 of twenty binary values (i.e., vernier period 360=(number of beams)×(period of test pattern period 350)= 5×4=20). That is, binary values with respect to specific beams repeat every fifth sweep.

This may be seen by observing that:1) spot locations 301a and 301e have a binary value of 1;2) spot locations 302a and 302e have a binary value of 0;3) spot locations 303a and 303e have a binary value of 0;4) spot locations 304a and 304e have a binary value of 1 and spot locations 305a and 305e have a binary value of 1. As such, in the embodiment of FIG. 3, the combination of binary values associated with a particular printhead begin to repeat every fifth sweep.

As stated above, one feature of a good test pattern is the ability of the pattern to highlight or otherwise draw attention to a vertical spacing 323a–d error. In the embodiment of FIG. 3, if the vertical spacings 323a–d are too wide (i.e., above one PEL) the printed lines associated with binary values 341 and 342 will be too close together as compared to the "designed for" distance of one PEL.

Another way of stating the same problem is that the overall span 370 of a single sweep should be 4.0 PELs (for a 5 beam printhead having a 1.0 PEL spacing 323a–d between spot location 310a–314a). If the spacings 323a–d are greater than 1;0 PEL the span 370 will be greater than 4.0 PELS. Similarly, if the spacings 323a–d are less than 1.0 PEL, the span 370 will be less than 4.0 PELs.

Thus, once binary values of 1 from different sweeps are placed adjacent to one another, such as binary values 341 and 342, any improper spacing 323a–d will result in neighboring printed lines being placed too close together (in the case of spacings 323a–d above 1.0 PEL) or too far apart (in the case of spacings below 1.0 PEL). To the viewer of the printed test pattern neighboring printed lines that are too close together will appear as a white bands at areas 380a,b. Also, to the viewer of the printed test pattern, neighboring printed lines that are too far apart will appear as dark bands at areas 380a,b.

Note that in cases where a vertical spacing 323a–d error exists, neighboring spot spacings from different sweeps are always either too close or too far apart. That is, neighboring spot spacing pairs 305a/301b, 305b,/301c, 305c/301d, 305d/301e are all either too close or too far apart depending on the type of vertical spacing 323a–d error. However, the neighboring spot spacing pair 305d/301e contributes most to an error that is noticeable by the viewer since this pair 305d/301e is a pair of neighboring printed lines (i.e., neighboring binary values of "1"). Such pairs may also be referred to as noticeable pairs.

Note further that, as discussed, noticeable pairs (e.g., noticeable pair 305d/301e) repeat according to the vernier period 360 determined by the test pattern period 350 and the number of beams in the printhead. In the embodiment of FIG. 3, as discussed above, the noticeable pairs repeat every 20 binary values. This repetition may be referred to as the vernier period 360. Thus a vernier period 360 is the magnitude of any repetitive sequence (such as a sequence of 1s and 0s) that noticeably reflects error in the spacings 323a–d between printhead spots. It is important to note that, for any DPI printer, the vernier period 360 corresponds to a distance on the printed page. This distance may be referred to as the wavelength, the wavelength of the noticeable pair, or the noticeable pair wavelength.

The fact that the error is repeatable according to the vernier period 360 may be used to further enhance the quality of the test pattern 340 as a device for detecting spacing error. Specifically, it is well known that the human eye is more perceptive to certain spatial frequencies (as compared to other spatial frequencies). In particular, as discussed in Kelly D. H., Visual Contrast Sensitivity, Optica Acta, Vol. 24, No. 2, pages 107–129 (1977) and Campbel F. W. and Green D. G., Optical and Retinal Factors Affecting Visual Resolution, Journal of Physiology, 181, pages 576–593 (1964) the human eye is most perceptive to spatial frequencies around 0.8 cycles per mm. This sensitivity is believed to be approximately the same for all colors (e.g., blue, yellow, red), thus the invention applies to color printer applications as well. To arrive at the spatial frequency for the greatest sensitivity, pychovisual units of cycles per degree have been converted to spatial frequency (cycles/mm) using 300 mm for a standard viewing distance.

The test sequence 340 may be further designed to produce bands at a spatial frequency at or near 0.8 cycles per mm. This corresponds to a wavelength of 1.25 mm. A 600 DPI printer corresponds to a 23.622 dots per millimeter printer. Thus, the vernier period 360 corresponds to a wavelength of 0.85 mm for a 600 DPI printer. Although 0.85 mm is not exactly 1.25 mm, it is proximate enough to the 1.25 mm value that a viewer will still perceive the banding caused by the spacing error.

A suitable range of the wavelength is 5.0 to 0.33 mm inclusive (which corresponds to a spatial frequency of 0.2 to 3.0 cycles per millimeter respectively). This range covers a workable range where viewers should be able to detect spacing 323a–d errors. Given that the test sequence should be designed to produce a vernier period 360 that corresponds to a wavelength near 1.25 mm, it is left to the individual designer to decide how much tolerance his/her test pattern can deviate from the 1.25 mm design point and still be useful for his/her application.

Other test patterns may be used for printheads having other than 5 beams. For example, a test pattern period of five binary values (e.g., "11000" or "00111") may be used with four beam printheads. These test patterns also produce a vernier period of 20 binary values. Thus, for 600 DPI printers, these patterns also correspond to a 0.85 mm wavelength. One of ordinary skill can further design other test patterns, test pattern periods, vernier periods etc. for any multiple beam printhead.

Figure 4:
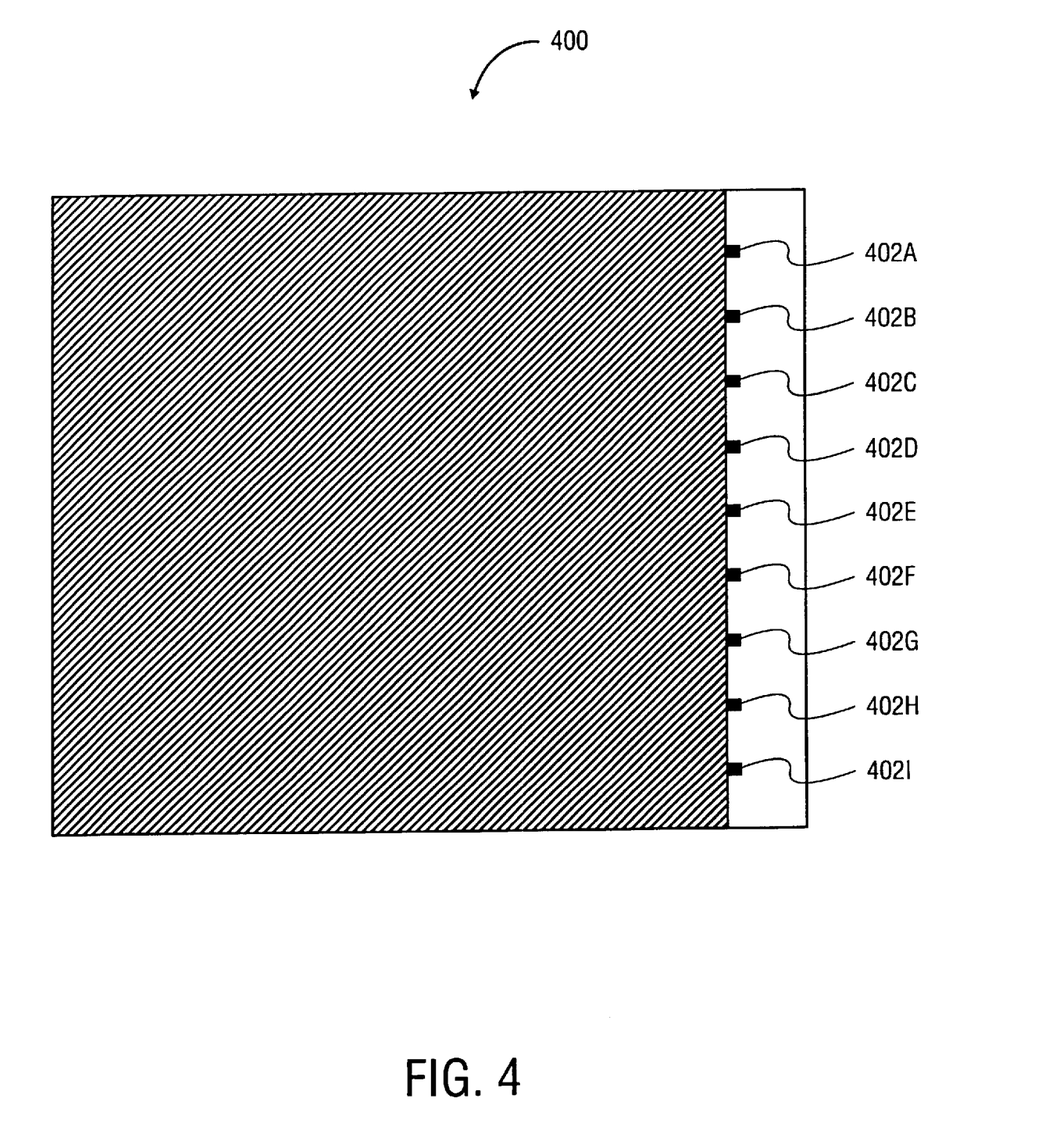
FIG. 4 shows a depiction of test pattern printout indicating correct beam spacing.
Figure 5:
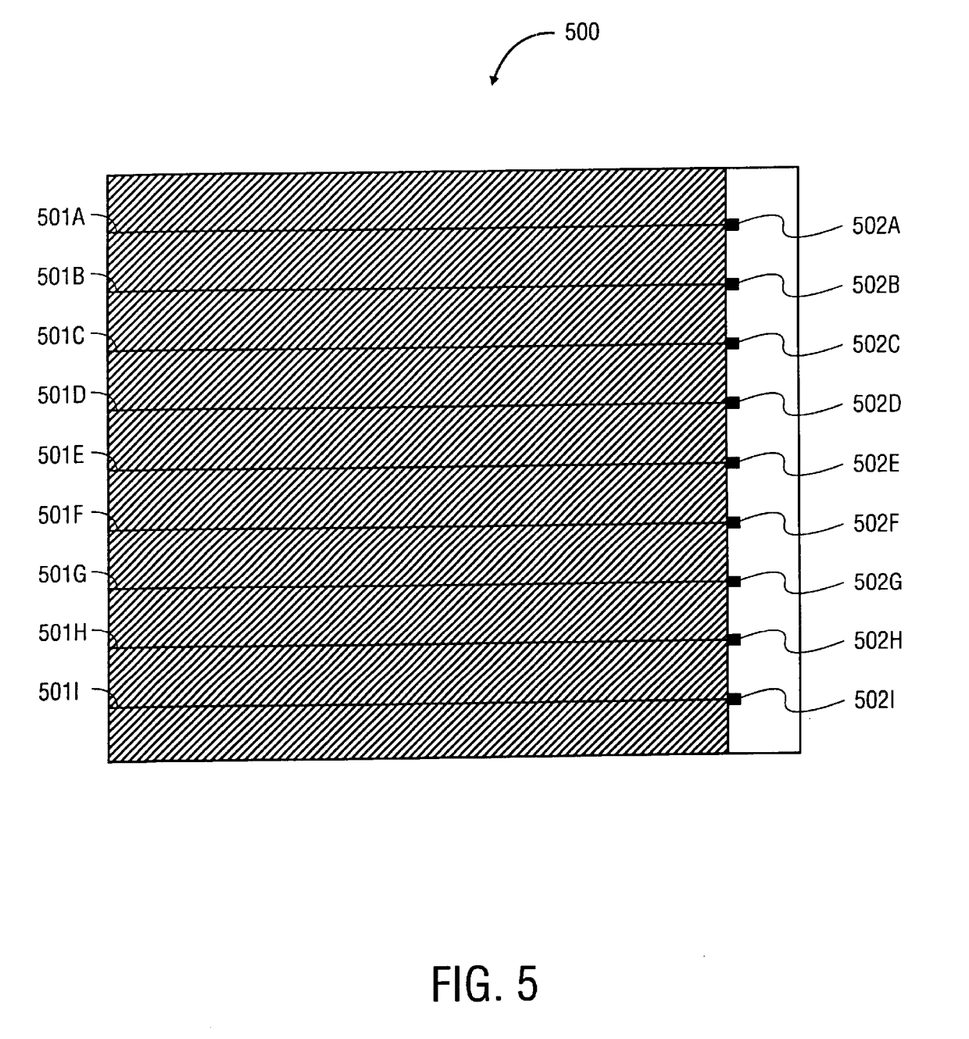
FIG. 5 shows a depiction of a test pattern printout indicating narrow printhead beam spacing.
Figure 6:
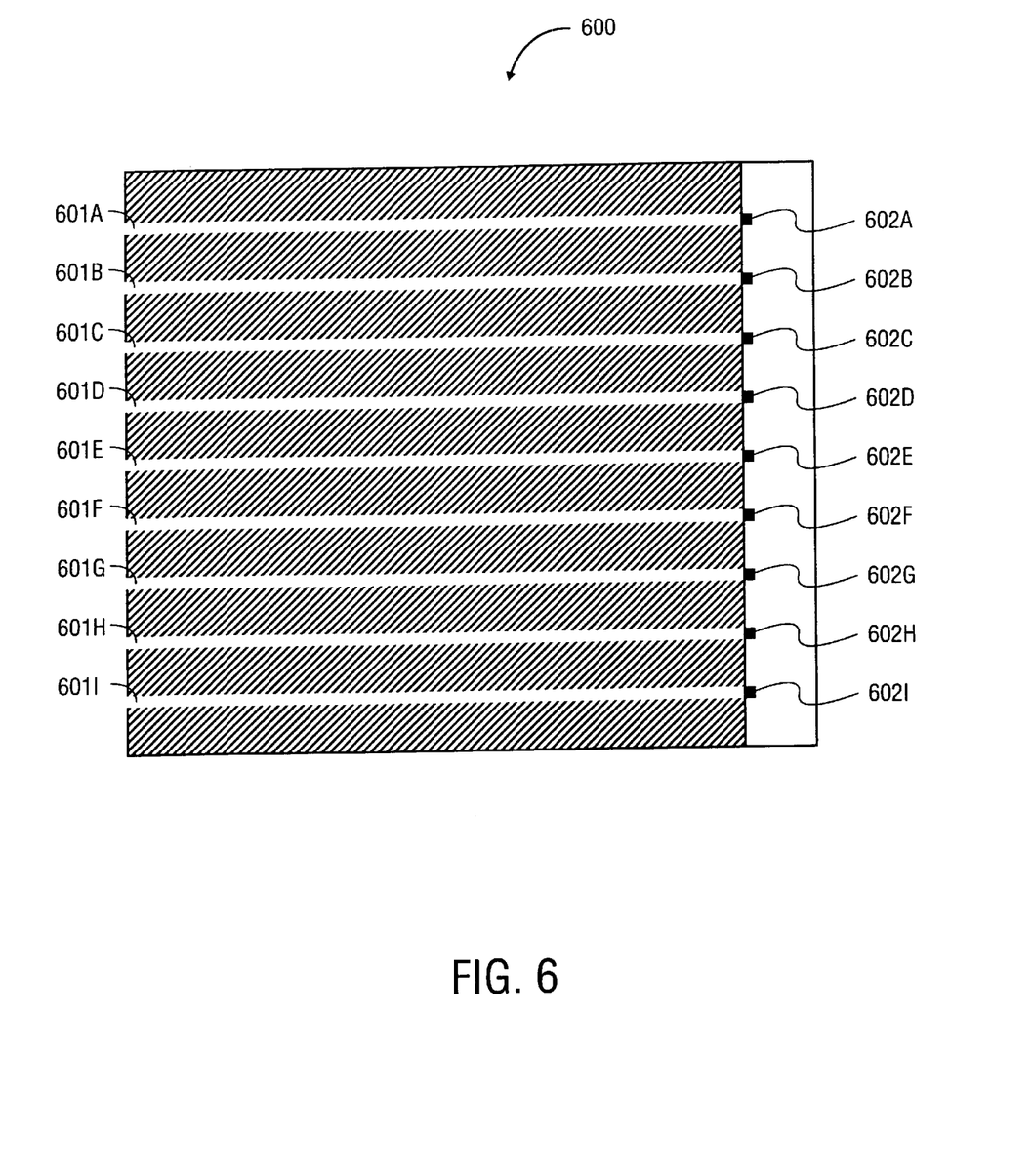
FIG. 6 shows a depiction of a test pattern printout indicating wide printhead beam spacing.

FIGS. 4, 5, 6 show a depiction of a test pattern printout 400, 500, 600. FIG. 4 shows an example where the vertical spacing associated with the printhead is at 1.0 PEL. No banding is observed in printout 400 therefore the spacing is accurate. FIG. 5 shows an example where the vertical spacing is too narrow. Narrow spacings result in dark bands 501a–i. FIG. 6 shows an example where the vertical spacing is too wide which results in white bands 601a–i. Note the reference marks 402a–i, 502a–i, 602a–i used in the printouts of FIGS. 4, 5 and 6. These reference marks 402a–i, 502a–i, 602a–i correspond to locations such as locations 380a, b in FIG. 3. The reference marks 402a–i, 502a–i, 602a–i should be incorporated into the test sequence printout 400, 500, 600 to aid field service personnel by directing their attention to the region of the test pattern where the bands are supposed to occur.

What is claimed is:

1. A method for testing a printer's optical alignment, said method comprising:

a) repeatedly printing a test pattern by sweeping a plurality of beams for a plurality of sweeps where each of said beams prints a bit of said test pattern and said test pattern repeats in a direction orthogonal to said sweep direction, said test pattern having a period, said plurality being an integer greater than one, said repeatedly printed test pattern having a vernier period that is determined by multiplying said test pattern period with said integer, said vernier period corresponding to a wavelength detectable to a human eye; and b) reducing a spacing between said beams if said repeatedly printed test pattern has a dark band.

2. The method of claim 1 further comprising observing said repeatedly printed test pattern.

3. The method of claim 1 wherein said dark band is aligned with a reference mark.

4. The method of claim 1 wherein said plurality of laser beams are swept across a photoconducting drum surface that electrostatically attracts toner particles in regions illuminated by said beams.

5. The method of claim 4 wherein said drum surface rotates between each of said plurality of sweeps.

6. The method of claim 1 wherein said vernier period is twenty.

7. The method of claim 6 wherein said test pattern period is four bits and said number of said beams is five beams.

8. The method of claim 1 wherein said test pattern is "1001".

9. The method of claim 1 wherein said test pattern is a repeating sequence of "00111".

10. The method of claim 1 wherein said test pattern is a repeating sequence of "11000".

11. The method of claim 1 wherein said wavelength is within a range of 0.33 to 5.0 mm inclusive.

12. The method of claim 1 wherein said repeatedly printed test pattern appears as a halftone when printed.

13. A method for testing a printer's optical alignment, said method comprising:
   a) repeatedly printing a test pattern by sweeping a plurality of beams for a plurality of sweeps where each of said beams prints a bit of said test pattern and said test pattern repeats in a direction orthogonal to said sweep direction, said test pattern having a period, said plurality being an integer greater than one, said repeatedly printed test pattern having a vernier period that is determined by multiplying said test pattern period with said integer, said vernier period corresponding to a wavelength detectable to a human eye; and
   b) increasing a spacing between said beams if said repeatedly printed test pattern has a light band.

14. The method of claim 13 further comprising observing said repeatedly printed test pattern.

15. The method of claims 13 wherein said light band is aligned with a reference mark.

16. The method of claims 13 wherein said plurality of laser beams are swept across a photoconducting drum that electrostatically attracts toner particles in regions illuminated by said beams.

17. The method of claim 16 wherein said drum surface rotates between each of said plurality of sweeps.

18. The method of claim 13 wherein said vernier period is twenty.

19. The method of claim 18 wherein said test pattern period is four bits and said number of said beams is five beams.

20. The method of claim 13 wherein said test pattern is "1001".

21. The method of claim 13 wherein said test pattern is a repeating sequence of "00111".

22. The method of claim 13 wherein said test pattern is a repeating sequence of "11000".

23. The method of claim 13 wherein said wavelength is within a range of 0.33 to 5.0 mm inclusive.

24. The method of claim 13 wherein said repeatedly printed test pattern appears as a halftone when printed.

25. An apparatus, comprising:
   a printer that repeatedly prints a test pattern by sweeping a plurality of beams for a plurality of sweeps where each of said beams prints a bit of said test pattern and said test pattern repeats in a direction orthogonal to said sweep direction, said test pattern having a period, said plurality being an integer greater than one, said repeatedly printed test pattern having a vernier period that is determined by multiplying said test pattern period with said integer, said vernier period corresponding to a wavelength detectable to a human eye, said beams separated by spacings that are reduced if said repeatedly printed test pattern has a dark band.

26. An apparatus, comprising:
   a printer that repeatedly prints a test pattern by sweeping a plurality of beams for a plurality of sweeps where each of said beams prints a bit of said test pattern and said test pattern repeats in a direction orthogonal to said sweep direction, said test pattern having a period, said plurality being an integer greater than one, said repeatedly printed test pattern having a vernier period that is determined by multiplying said test pattern period with said integer, said vernier period corresponding to a wavelength detectable to a human eye, said beams separated by spacings that are increased if said repeatedly printed test pattern has a light band.

\* \* \* \* \*